US005761535A

United States Patent [19]

Neifert et al.

[11] Patent Number: 5,761,535

[45] Date of Patent: Jun. 2, 1998

[54] SYSTEM FOR MULTI-STAGE SERPENTINE-SHAPED BUFFER WITH FIRST TURN AROUND AREA AFTER FIRST PLURALITY OF STAGES AND SECOND TURN AREA AFTER SECOND PLURALITY OF STAGES

[75] Inventors: Leonard Neifert, Allentown, Pa.; David Nyffenegger, Raleigh, N.C.; Harry Noll, Allentown, Pa.; Steve McCay, Raleigh, N.C.

[73] Assignee: Bell & Howell Phillipsburg Company, Allentown, Pa.

[21] Appl. No.: 584,220

[22] Filed: Jan. 4, 1996

Related U.S. Application Data

[63] Continuation of Ser. No. 544,811, Oct. 18, 1995, abandoned.

[51] Int. Cl.$^{6}$ ..................... G06F 13/00

[52] U.S. Cl. ..................... 395/882; 355/209; 271/3; 271/3.1; 270/55; 209/539

[58] Field of Search ..................... 355/309; 271/3, 271/3.1; 270/55; 209/539

[56] References Cited

U.S. PATENT DOCUMENTS 4,176,945 12/1979 Holzhauser et al. .................. 355/23
4,784,379 11/1988 Vander Syde et al. .................. 270/55
4,896,876 1/1990 Yamada et al. .................. 271/265
4,937,634 6/1990 Hirabayashi et al. .................. 355/309
4,968,419 11/1990 Karalus et al. .................. 209/539
5,085,418 2/1992 Rapkin et al. .................. 271/3.1
5,098,077 3/1992 Russel .................. 271/3.1
5,197,723 3/1993 Yamada et al. .................. 271/3
5,333,043 7/1994 Yamada .................. 355/309
5,377,966 1/1995 Ohmori .................. 271/3

*Primary Examiner*—Thomas C. Lee
*Assistant Examiner*—Anderson I. Chen
*Attorney, Agent, or Firm*—Millen, White, Zelano & Branigan, P.C.

[57] ABSTRACT

A multi-stage, serpentine-shaped buffer has an entry area for receiving documents, a first level comprising a first plurality of document stages, a first turn-around for substantially reversing the direction of document travel following said first plurality of stages, a second level vertically adjacent to said first level, said second level comprising a second plurality of document stages, a second turn-around for substantially reversing the direction of document travel, and a third level vertically adjacent to said second level, said third level comprising a third plurality of document stages.

11 Claims, 5 Drawing Sheets

SYSTEM FOR MULTI-STAGE SERPENTINE-SHAPED BUFFER WITH FIRST TURN AROUND AREA AFTER FIRST PLURALITY OF STAGES AND SECOND TURN AREA AFTER SECOND PLURALITY OF STAGES

This Application is a continuation of U.S. application Ser. No. 08/544,811, filed Oct. 18, 1995, now abandoned.

BACKGROUND OF THE INVENTION

This Application is related to U.S. application Ser. No. 08/544,811 entitled "HIGH THROUGHPUT DOCUMENT-PROCESSING MACHINE HAVING DYNAMIC SPEED CONTROL," filed on Oct. 18, 1995, now abandoned on behalf of David Nyffenneger, et al. The entire disclosure of that application is incorporated herein by reference.

1. Field of the Invention

The invention relates in general to machines for automated processing of mailpieces, and in particular to a serpentine multi-stage buffer for queueing a plurality of documents or document sets.

2. Related Art

Computer-controlled insertion machines have been known for providing high-speed, automated insertion of documents into envelopes. Such insertion machines typically include a form feeder, or "roll unwind," for supplying a web of attached sheets (or a sheet feeder for supplying individual sheets), with several adjacent sheets being associated together as a set; a burster or cutter for separating the web into individual sheets, those sheets including for each set a master document having an optical mark thereon for providing insertion instructions and other information about the set; a reader for reading the optical mark and providing the information therein to a central computer; an accumulator for accumulating individual sheets fed seriatim thereto into stacked sets; a folder for folding the sets; a series of insert hoppers for selectively feeding inserts onto the folded sets as the sets travel past the hoppers on an insert track/conveyor; an insert station for inserting each set and its associated inserts into an envelope; a sealer for sealing and closing the flap on the envelopes; and, a postage meter for applying postage to the completed mail piece.

Sheet-retarding devices have been used in document-processing machines of the prior art for temporarily slowing and/or stopping a mailpiece or other document as it travels along a conveyor. Such devices are typically provided for purposes of registering a document and/or ensuring that the same predetermined distance exists between each successive document. Sheet-retarding devices of the prior art typically include a gate which is selectively actuated by a rotary solenoid such that the gate drops down to momentarily restrict movement of a document along the conveyor. Once registration and/or delay of the mailpiece is complete, the gate is retracted by the solenoid and the document continues along the conveyor.

While sheet-retarding devices of the prior art have been provided for purposes of ensuring a uniform distance between documents output therefrom, such devices have failed to provide a means for adequately reducing a document throughput rate when that rate becomes higher than the rate at which a downstream device (such as a downstream inserter) can receive documents. The devices of the prior art typically have only one or two staging areas, e.g., areas where documents are slowed or halted, and therefore lack the mechanical staging capacity to provide adequate throughput rate compensation. Further, such devices lack the control logic and timing required to compensate for variations in the distance between documents fed thereto.

OBJECTS AND SUMMARY OF THE INVENTION

It is therefore an object of the invention to provide an improved document-staging device.

It is a further object of the invention to provide a document staging device with increased staging capacity.

It is a further object of the invention to provide a document-staging device which can compensate for large variations in the rate at which documents are delivered thereto.

It is a further object of the invention to provide a multi-stage document-staging device having a small footprint.

In a preferred embodiment, the invention provides a multi-stage, serpentine-shaped buffer having an entry area for receiving documents, a first-level comprising a first plurality of document stages, a first turn-around for substantially reversing the direction of document travel following said first plurality of stages, a second level vertically adjacent to said first level, said second level comprising a second plurality of document stages, a second turn-around for substantially reversing the direction of document travel, and a third level vertically adjacent to said second level, said third level comprising a third plurality of document stages.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
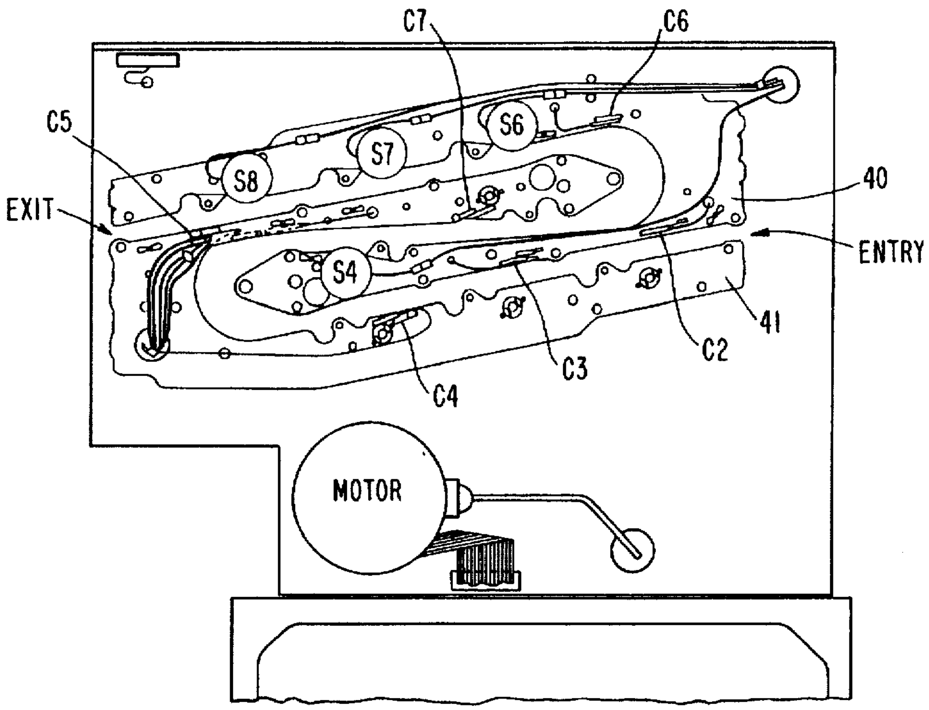
FIG. 1 illustrates a partial left side elevational view of a multi-stage buffer of the invention.
Figure 2:
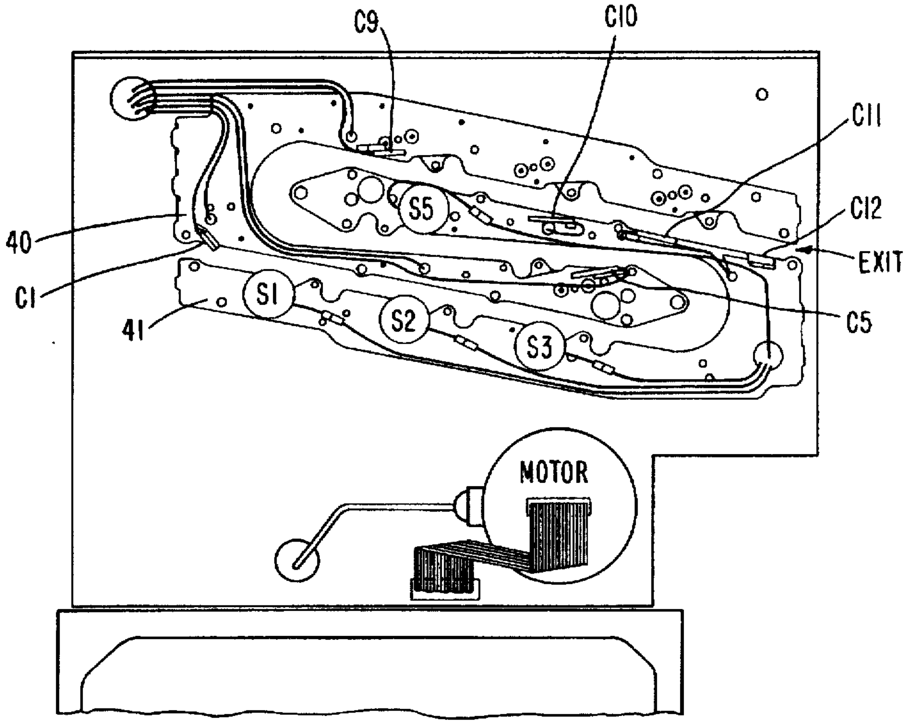
FIG. 2 illustrates a partial right side elevational view of a multi-stage buffer of the invention.

FIGS. 1 and 2 illustrate partial left and right side views, respectively, of a multi-stage buffer of the invention according to a first embodiment. The buffer of the invention is used, e.g., between an asynchronous upstream device (such as an accumulator) and a downstream synchronous device (such as an insertion section of an insertion machine). The buffer of the invention may be used to compensate for temporary document throughput speed changes at the accumulator such that documents are delivered to the downstream insertion section at a constant, optimized rate.

The buffer comprises a generally C-shaped upper frame assembly 40 and a generally C-shaped lower frame assembly 41. The assemblies 40 and 41 are interlocked as shown in FIGS. 1 and 2 to define an S-shaped path therebetween. Document sets enter the buffer and proceed along the S-shaped path past a series of eight stages. In the preferred embodiment, three stages are provided in the lower level of the S-shaped path, two stages are provided in the middle level, and three stages are provided in the upper level.

At each stage is a stop gate controlled by an associated rotary solenoid S1 through S8. If it is desired that a set be stopped at a particular stage, the solenoid at that stage is actuated and its associated stop gate is thereby caused to obstruct the document path and stop the set at that stage. When the set is to be released, the solenoid is reversely actuated, causing the gate to retract, thereby permitting the document to continue along the S-shaped path.

A multitude of product sensors C1 through C12 are located along the S-shaped path to track individual sets through the device and to monitor proper transport and detect any jams. The sensors C1 through C12 are positioned at the entry, exit, each loop turn-around and one in each of the eight buffer stages. The sensors in each of the eight buffer stages are used, e.g., to permit a dynamic speed control system to determine the number of buffer stages which are filled and to increase or decrease the speed of devices upstream from the buffer accordingly.

Figure 3:
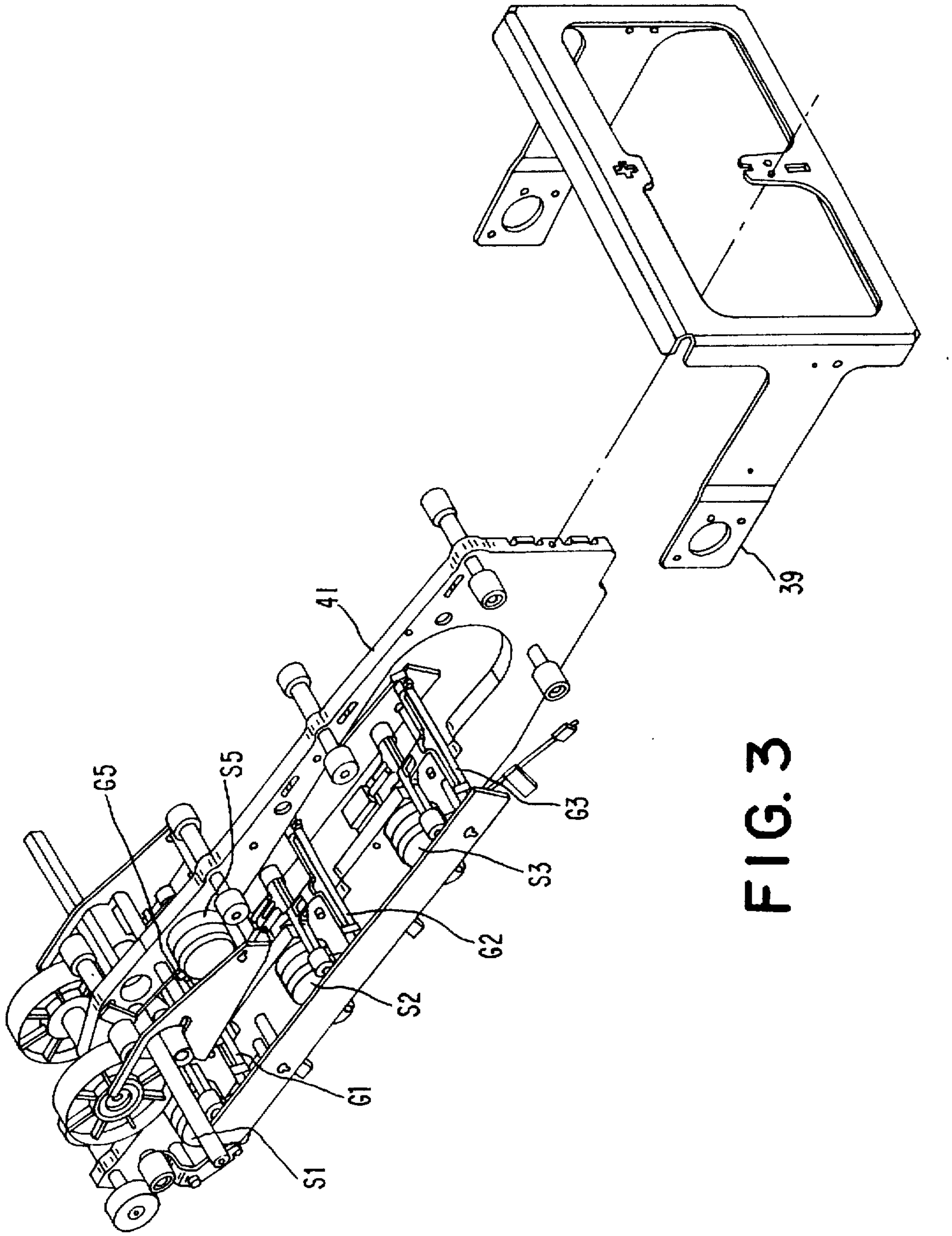
FIG. 3 illustrates a left-side perspective view of a lower frame assembly of the buffer device of the invention.
Figure 4:
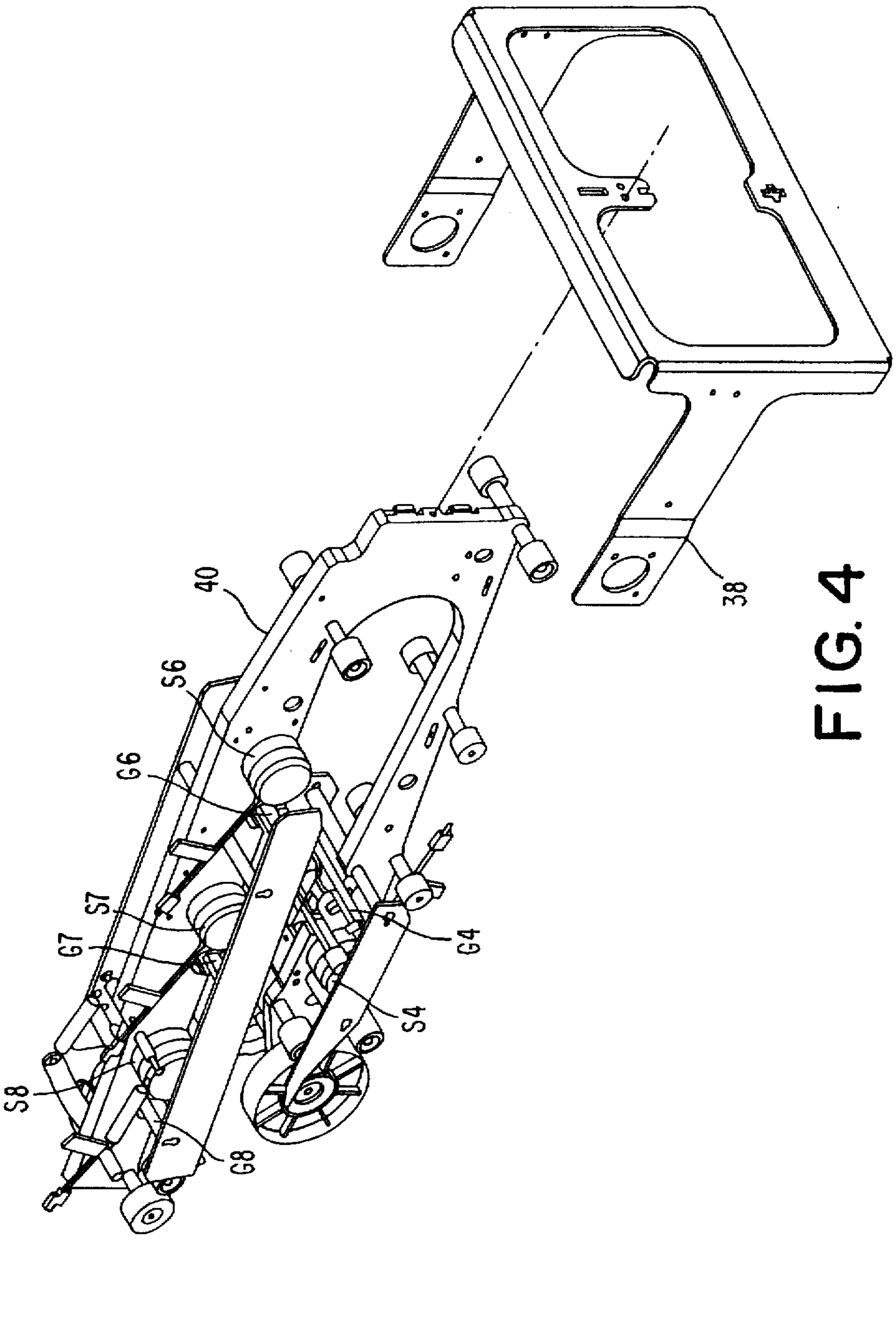
FIG. 4 illustrates a right-side perspective view of an upper frame assembly of the buffer device of the invention.

FIGS. 3 and 4 illustrate a left-side perspective view of the lower frame assembly 41 and a right-side perspective view of the upper frame assembly 40, respectively. Each solenoid S1 through S8 has associated with it a stop gate G11 through G8. The stop gates are illustrated and discussed in more detail below with reference to FIG. 5. The lower frame assembly 41 is attached to a first support frame 39 and the upper frame assembly 40 is attached to a second support frame 38. When the upper and lower frame assemblies are interlocked (as shown in FIG. 1), these support frames are at opposite ends of the interlocked assemblies.

Figure 5:
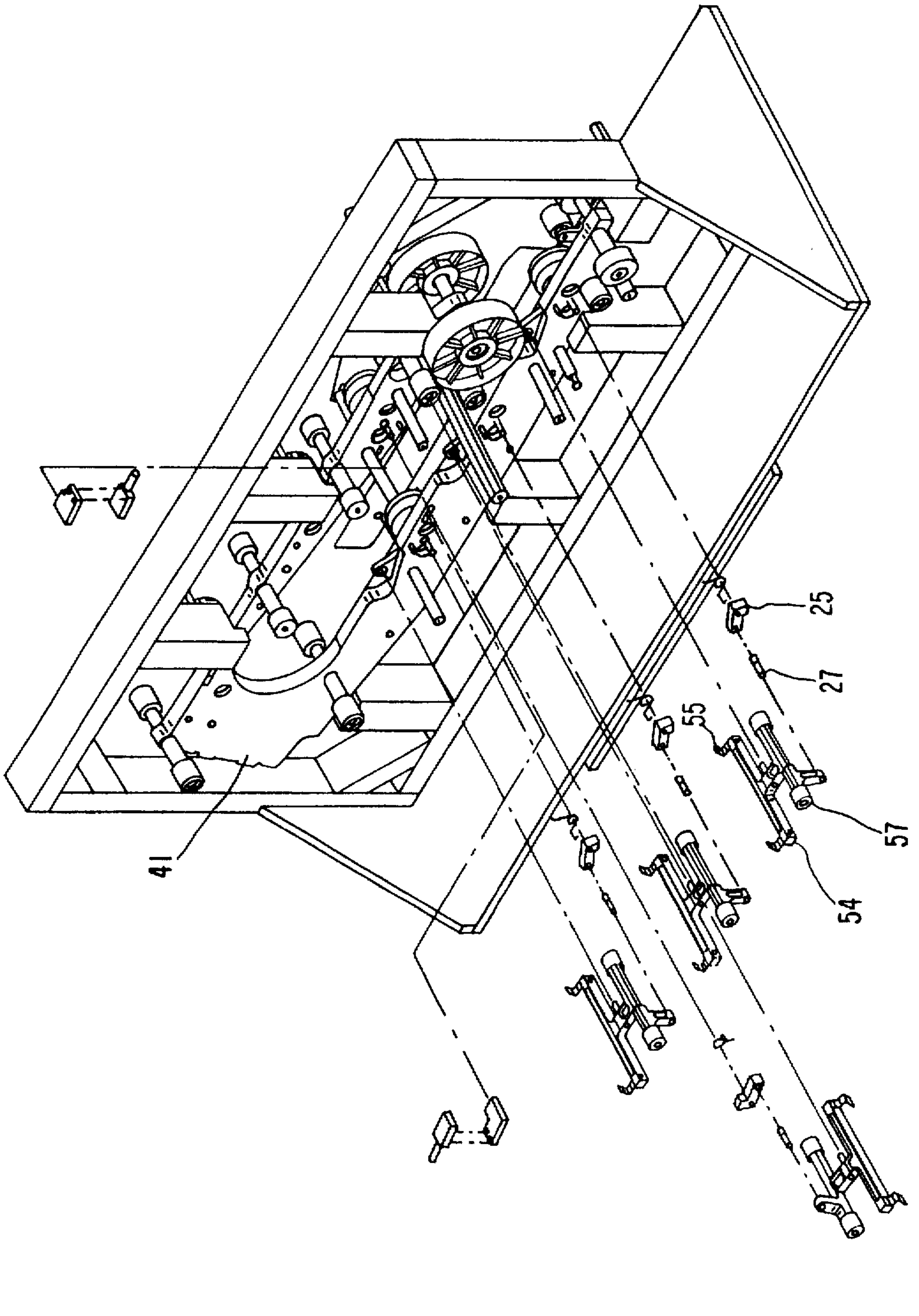
FIG. 5 illustrates a partial view of the lower frame assembly with certain parts removed to show the stop gate assemblies.

FIG. 5 illustrates a partial view of the lower frame assembly with certain parts removed to show the stop gate assemblies. It should be noted that the a stop gate assembly 54 is attached to the shaft of its associated rotary solenoid via press pins 27 and solenoid levers 25 such that actuation of the solenoid causes the stop gate to rotate about its axis 57. The stop gate assembly 54 includes two gate fingers 55 which rotate into and out of the document path when the solenoid is actuated and reversely actuated, respectively. A spring 20 biases the solenoid levers 25 such that the stop gate assembly 54 remains in a "closed" position (i.e., it is positioned such that its gate fingers 55 obstruct the document path) when the associated solenoid is not active.

Figure 6:
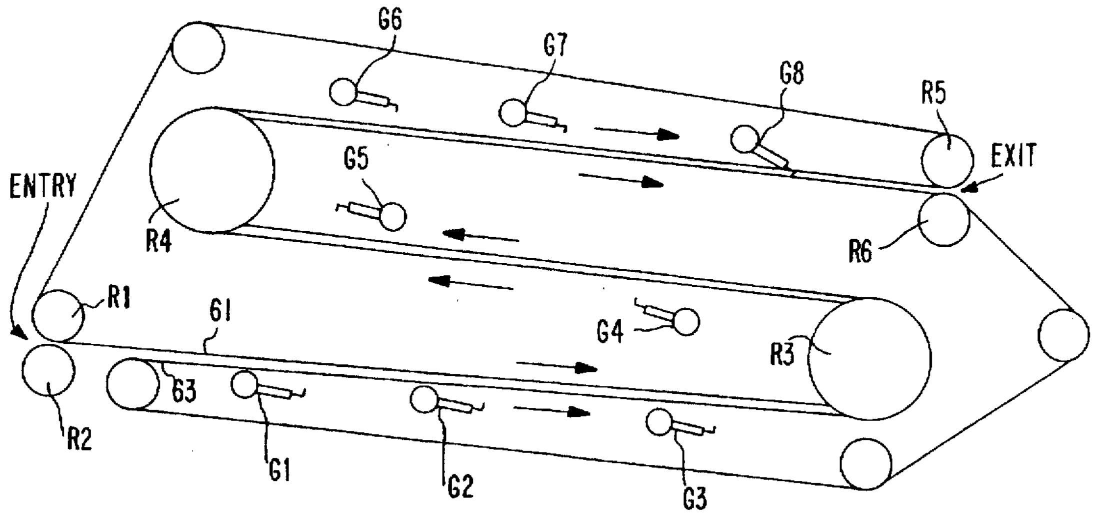
FIG. 6 illustrates a right side elevational view of a belt transport system of the invention.

FIG. 6 illustrates a schematic side elevational view of a belt system for transporting sets along the S-shaped document path. The system generally comprises two belts 61 and 63 which engage a series of rollers, with at least one of the rollers being driven by a motor (FIG. 1) at a substantially constant speed. While FIG. 6 illustrates a right side view, it should be understood that a second, similar belt system would be seen from a left side view. FIG. 6 also illustrates the stop gate assemblies G1 through G8 at each of the stages. Stop gate assembly G8 is shown in the "closed" position, and the remaining gate assemblies are shown in the "open" position.

A document set enters the buffer at the nip between a pair of rollers R1 and R2 and is then engaged on its top and bottom broad sides by belts 61 and 63, respectively. The set proceeds between the belts along the lower level and ultimately reaches the roller R3, where reverses direction by being transported around the roller R3. The set then proceeds between the belts along the middle level and ultimately reaches the roller R4, where it reverses direction once again by being transported around the roller R4. The set then travels between the belts along the upper level until it reaches the nip between roller R5 and R6, whereupon it is released from the buffer.

A document in the eighth stage, i.e., the final stage, is released upon request by the host inserter for a new document. The first, second, fourth, sixth, and seventh stages, which are the stages that do not directly preceed a turn around, are released when either the next stage is empty or a set in the next stage clears the sensor in the next stage. The third and fifth stages, which directly preceed the turnarounds, are released when either the next associated stage is empty or the next associated stage is released. The third and fifth stages will also be released when a set entering the next associated stage will be released immediately and that set reaches the lead edge sensor in the turn around. In each stage, the gate solenoid associated with that stage is de-energized when the set clears the sensor in the stage. The solenoids are all normally de-enegerized.

A first document set in a series is delivered to the buffer by the upstream accumulator (or other asynchronous upstream device) and enters the S-shaped path of the buffer. The first document set travels past the first seven stages of the buffer without stopping, and stops at the eighth stage. Assuming that the downstream insertion section is ready to receive the first document set, the set is released from the buffer and proceeds to the insertion section in synchronicity with the insertion section's machine cycle.

If subsequent document sets are then delivered to the buffer at a constant throughput speed which is approximately equal to the rate at which the insertion section can receive them, then they too will travel unobstructed past the first seven stages, pause briefly at the eighth stage, and be delivered to the insertion section.

However, if the accumulator then begins to output documents to the buffer at a higher speed such that a document set would arrive at the eighth stage before the preceding set has been released to the insertion section, then the solenoid S7 at the seventh stage will be actuated and cause that set to pause at the seventh stage while the eigth stage is occupied. At this point, the eighth and seventh stages of the buffer are said to be "filled."

In this respect, it will be understood by those skilled in the art that subsequent throughput speed increases at the accumulator will result in more buffer stages being filled at a given time, and subsequent throughput speed decreases will result in fewer buffer stages being filled.

Figure 7:
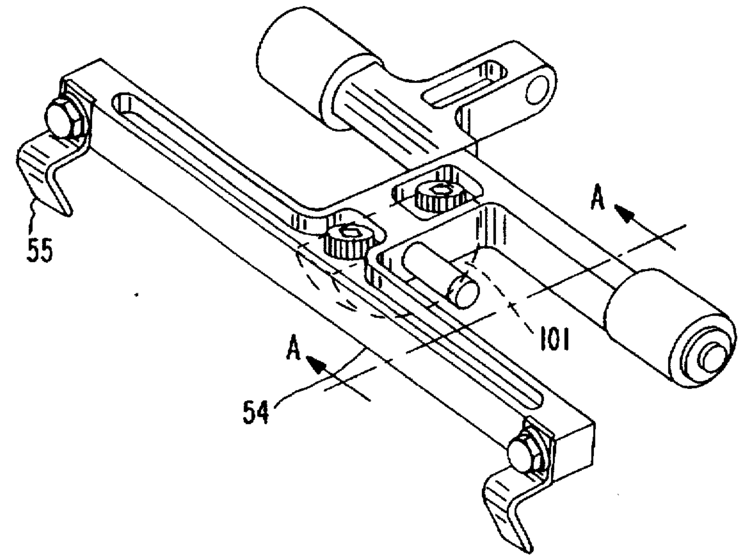
FIG. 7 illustrates a perspective view of a stop gate assembly of the invention according to a preferred embodiment.

FIG. 7 illustrates a stop gate assembly 54 of the invention according to a preferred embodiment. In addition to the gate fingers 55, the stop gate assembly 54 after includes a document-deceleration tire, or "ramp" 101. The document-deceleration ramp 101 imparts a deceleration to a document approaching the gate fingers 55, and preferably comprises a polymer material with a suitable coefficient of friction for performing that function. Such materials include, e.g., acetal resin materials such as highly-crystalline polyformaldehyde homopolymers. These materials are marketed by E.I. Dupont De Nemours and Company under the name "DEL- RIN." The document-deceleration ramp 101 is fastenened to the body of the gate assembly 54 via conventional means.

Figure 8:
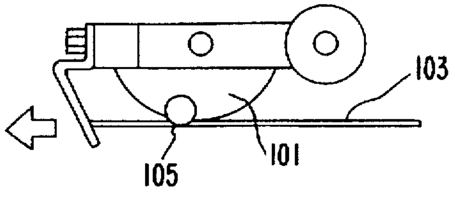
FIG. 8 illustrates a side elevational view of a stop gate assembly of the invention according to a preferred embodiment.

FIG. 8 illustrates a side elevational view from the perspective "A—A" of the stop gate assembly illustrated in FIG. 7. An anti-bounce-back plug 105 is inserted into a hole drilled in the lower surface of the document-deceleration ramp 101, and is held therein via a friction-fit. The anti-bounce back plug 105 is of a material which has a higher co-efficient of friction than the material of the document-deceleration ramp 101, and serves to further decelerate an approaching document 103 prior to the document's impact at the gate fingers 55 but subsequent to initial deceleration by the document-deceleration ramp 101. The combination of the anti-bounce-back plug and the document-deceleration ramp provides improved resistance to document bounce-back, while avoiding curling and other forms of paper jams. The anti-bounce-back plug 105 preferably comprises a suitable high-coefficient-of-friction polymer material, such as copolymers and terpolymers of vinylideneflouride hexaflouropropylene and tetraflouroethylene (commercially-available from the E.I. Dupont De Nemours and Company under the name "VITON"), or neoprene. The anti-bounce-back plug 105 is preferably removable for replacement due to wear. Plugs of different materials having various coefficients of friction can be used interchangeably to match the particular document material.

While the invention has been particularly shown and described with reference to a preferred embodiment thereof, it will be understood by those skilled in the art that various changes in form and details may be made therein without departing from the spirit and scope of the invention. For example, while an S-shaped buffer having three levels has been described herein, a buffer within the scope of the invention may comprise additional levels if, e.g., more than eight stages are desired.

The embodiments of the invention in which an exclusive property or privilege is claimed are defined as follows:

1. A multi-stage, serpentine-shaped buffer comprising:

an entry area for receiving documents;

a first level comprising a first plurality of document stages;

a first turn-around for substantially reversing the direction of document travel following said first plurality of stages;

a second level vertically adjacent to said first level, said second level comprising a second plurality of document stages;

a second turn-around for substantially reversing the direction of document travel; and, a third level vertically adjacent to said second level, said third level comprising a third plurality of document stages.

2. The multi-stage buffer according to claim 1, wherein said first plurality of document stages comprises a respective plurality of stop gate means.

3. The multi-stage buffer according to claim 2, wherein said first plurality of document stages further comprises a respective plurality of solenoids for actuating said plurality of stop gate means.

4. The multi-stage buffer according to claim 1, further comprising:

two driven endless transport belts extending around a plurality of pullies to define a serpentine-shaped transport path.

5. A method of selectively delaying documents in a document-processing machine, comprising:

receiving said documents in a serpentine-shaped multi-stage buffer;

transporting said documents through a first plurality of stages on a first level;

selectively actuating a first plurality of stop gates, respectively positioned at said first plurality of stages, so as to selectively pause, or not pause, each of said documents at each of said first plurality of stages;

transporting said documents through a turn-around, whereby the direction in which said documents travel is substantially reversed;

transporting said documents through a second plurality of stages on a second level; and, selectively actuating a second plurality of stop gates, respectively positioned at said second plurality of stages, so as to selectively pause, or not pause, each of said documents at each of said second plurality of stages.

6. A multi-stage buffer for selectively delaying documents in a document-processing machine, comprising:

a plurality of stages at which documents can be selectively paused;

a plurality of stop gate means respectively associated with said plurality of stages, each of said stop gate means comprising:

at least one gate finger means against which a leading edge of at least one of said documents is registered; and, document-deceleration ramp means upstream from said gate finger means for engaging and decelerating said at least one document prior to registration of said leading edge against said gate finger means.

7. The multi-stage buffer according to claim 6, wherein each of said stop gate means further comprises:

anti-bounce-back means, having a high coefficient of friction with respect to that of said document-deceleration ramp means, for engaging and decelerating said at least one document.

8. The multi-stage buffer according to claim 7, wherein said anti-bounce-back means comprises an anti-bounce-back plug integrated into said document-deceleration ramp means.

9. The multi-stage buffer according to claim 7, wherein said anti-bounce-back means comprises polymers of vinylideneflouride hexaflouropropylene and tetraflouroethylene.

10. The multi-stage buffer according to claim 9, wherein said document-deceleration ramp. comprises highly-crystalline polyformaldehyde homopolymers.

11. A multi-stage, serpentine-shaped buffer comprising:

an entry area for receiving documents;

a first level comprising a first plurality of document stages;

a first turn-around for substantially reversing the direction of document travel following said first plurality of stages;

a second level vertically adjacent to said first level, said second level comprising a second plurality of document stages;

a second turn-around for substantially reversing the direction of document travel;

a third level vertically adjacent to said second level; and, an exit area for discharging documents for downstream processing.

* * * * *